(12) United States Patent
Scheich

(10) Patent No.: US 11,841,601 B2
(45) Date of Patent: Dec. 12, 2023

(54) OVOID VEHICLE PHOTOGRAPHIC BOOTH

(71) Applicant: Carvana, LLC, Tempe, AZ (US)

(72) Inventor: Davo Scheich, Troy, MI (US)

(73) Assignee: Carvana, LLC

(*) Notice: Subject to any disclaimer, the term of this patent is extended or adjusted under 35 U.S.C. 154(b) by 168 days.

(21) Appl. No.: 17/438,094

(22) PCT Filed: Apr. 13, 2020

(86) PCT No.: PCT/US2020/027914
§ 371 (c)(1),
(2) Date: Sep. 10, 2021

(87) PCT Pub. No.: WO2020/210790
PCT Pub. Date: Oct. 15, 2020

(65) Prior Publication Data
US 2022/0187685 A1    Jun. 16, 2022

Related U.S. Application Data

(60) Provisional application No. 62/832,517, filed on Apr. 11, 2019.

(51) Int. Cl.
*G03B 15/06* (2021.01)
*G03B 17/48* (2021.01)
(Continued)

(52) U.S. Cl.
CPC ............. *G03B 15/06* (2013.01); *G03B 17/48* (2013.01); *G03B 17/561* (2013.01); *G03B 35/02* (2013.01);
(Continued)

(58) Field of Classification Search
CPC ...... G03B 15/06; G03B 17/48; G03B 17/561; G03B 35/02; G03B 35/08; G06K 7/10366;
(Continued)

(56) References Cited

U.S. PATENT DOCUMENTS 8,112,325 B2    2/2012   Foy et al.
10,311,636 B1   6/2019   Falstrup et al.
(Continued)

FOREIGN PATENT DOCUMENTS

JP    2001013578 A    1/2001

OTHER PUBLICATIONS

Int'l Search Report for PCT/US2020/027914, dated Jul. 30, 2020.

*Primary Examiner* — Daquan Zhao
(74) *Attorney, Agent, or Firm* — SNELL & WILMER L.L.P.

(57) ABSTRACT

A vehicle photographic booth is provided that accommodates cameras with lenses with focal lengths that avoid wide angle distortion that is common in low end car photography. The photographic booth has an ovoid hemispherical dome shape with a camera mounted at the apex of the ovoid portion so as to accommodate longer focal length lenses. The overall dimension of the ovoid section of the dome for placement of a camera is determined by the available floor space of a user. The use of an enclosed ovoid hemispherical dome shape that rotates with respect to a stationary stage, or in the alternative a fixed enclosed ovoid hemispherical dome with a rotating stage allows for much less light to be needed as compared to a full open volume. An ovoid shape also provides a smaller fixed footprint than a full structure for an equal camera distance from a subject.

20 Claims, 12 Drawing Sheets

(51) Int. Cl.
*G03B 35/02* (2021.01)
*H04N 13/282* (2018.01)
*G03B 17/56* (2021.01)
*G06K 7/10* (2006.01)
*H04N 23/56* (2023.01)
*H04N 23/66* (2023.01)
*H04N 23/695* (2023.01)
*G03B 35/08* (2021.01)

(52) U.S. Cl.
CPC ....... *G06K 7/10366* (2013.01); *H04N 13/282* (2018.05); *H04N 23/56* (2023.01); *H04N 23/66* (2023.01); *H04N 23/695* (2023.01)

(58) Field of Classification Search
CPC ...... H04N 23/66; H04N 23/56; H04N 13/282; H04N 23/695
USPC ............... 348/42, 61, 68, 118; 386/358, 359
See application file for complete search history.

(56) References Cited

U.S. PATENT DOCUMENTS

| | | | |
|---|---|---|---|
| 2015/0012168 A1* | 1/2015 | Kuklish | F16M 11/425 701/23 |
| 2016/0100087 A1* | 4/2016 | Scheich | G06T 1/0007 348/47 |
| 2016/0381323 A1* | 12/2016 | Garcia, III | G06Q 30/0641 348/38 |
| 2018/0160019 A1* | 6/2018 | Scheich | G06T 1/0007 |
| 2019/0056483 A1* | 2/2019 | Bradley | G01S 7/4815 |

* cited by examiner

OVOID VEHICLE PHOTOGRAPHIC BOOTH

RELATED APPLICATIONS

This application claims priority benefit of U.S. Provisional Application Ser. No. 62/832,517 filed 11 Apr. 2019, the contents of which are hereby incorporated by reference.

FIELD OF THE INVENTION

The present invention in general relates to a system for photographing vehicles; and in particular, to an ovoid hemispherical photographic booth where an automated process captures a series of vehicle images and uploads the captured images to a web template for display and recordation.

BACKGROUND OF THE INVENTION

Online auto sales and auto auctions have been growing in popularity. One of the most popular online auctions to buy vehicles from is eBay™. On eBay Motors™, a user can create an account and put their vehicles up for auction. Other popular websites include Cars.com™. Typically, online vehicle sales are based solely on images of the vehicle, since the buyer is in a remote location and is unable to view the vehicle in question in person. Thus, many high-quality images are required of the vehicle from many perspectives to allow a buyer to gain an understanding of a subject vehicle's condition and appearance. FIGS. 1A and 1B are typical non-studio quality vehicle photographs that are used to list vehicles for sale. The images shown in FIGS. 1A and 1B are of low quality and require a dedicated employee to move vehicles and physically move around the subject vehicle to take the pictures. The photographer also has to manually collate the images, name, and upload the files, which is a labor intensive and time-consuming task, considering one photographer may be required to shoot upwards of 75 vehicles a day.

Furthermore, producing high quality images is not only time consuming, but is costly and requires a studio set up. Vehicle images are particularly hard to obtain without unwanted reflections of the photographer or the surroundings; however, reflection free images are critical to be able to discern surface imperfections, scratches, and dents on a vehicle surface. FIGS. 2A and 2B illustrate an existing studio configuration 10 for generating a contrast break line 12 on a vehicle with additive lighting. The bottom edge 16 of a light box 14 creates the break line 12 between highlight and shadow. FIGS. 3A and 3B illustrate an existing studio configuration 20 for generating a contrast break line 12 on a vehicle with subtractive lighting. The bounce fill light is a large source and makes a soft reflection in the sheet metal. A gray wall is added to "subtract" the reflection from the lower half of the truck to create contrast and shape.

While these studio shots are effective in creating high quality vehicle images, the studio shots are not amenable to the high throughput required for high volume vehicle sales. Thus, there is a need to be able to rapidly produce high quality reflection free images of vehicles from multiple angles and perspectives.

In order to increase throughput for creating high quality vehicle images a drive through photographic tunnel as disclosed in U.S. Pat. No. 10,063,758 issued Aug. 28, 2018 and a circular dome photographic booth as disclosed in U.S. Patent Publication US2018/0160019; both of which are included herein in their entirety have been implemented. Both the photographic tunnel and circular dome have a plurality of cameras mounted within the walls for recording images of a vehicle that are uploaded to a database that is used to generate image data from the vehicle positioned in the structure. The systems further include a lighting system and a tracking system to actuate one or more of the plurality of cameras and lights in a predetermined sequence and combination based on the position of the vehicle within the circular domed structure.

U.S. Pat. No. 9,046,740 issued Jun. 2, 2015 discloses a vehicle photographic studio with a stationary circular platform a vertical upright curved wall defining a backdrop that partially surrounds the platform, a front curved overhead member mounted across a side opening in the wall, and a plurality of spaced apart rollers rotatably mounted on a lower end portion of the wall and engaged with the track so as to mount the wall upon the track for undergoing revolvable movement along the track and about the platform to relocate the side opening of the wall at any selected angular position in relation to the platform. However, the disclosed concept while providing a controlled background that eliminates confusing backgrounds of a parking lot as shown in FIG. 1B fails to control reflections in the vehicle surface as was previously shown in FIG. 1C.

It is further noted that existing photographic booth solutions fail to utilize or accommodate cameras with longer focal length lenses that avoid wide angle distortion so common in low end car photography. Most advertising grade automotive photography of vehicles is shot with a 105-135 mm lens, and most dealers shoot in a parking lot with a 28 mm lens.

Thus, there continues to be need for improved photographic chambers that are able to utilize camera lenses with a greater focal length to eliminate wide angle distortion, while also controlling unwanted reflections in surfaces of vehicles being photographed within photographic chambers.

SUMMARY

A system for photographing a vehicle is provided that includes a drive-in booth shaped as an ovoid hemispherical dome having a wider semi-circular portion and a narrower ovoid portion. A camera is mounted at an apex of the ovoid portion at a focal length from the vehicle, where the focal length is greater than a radius of the semi-circular portion, the camera providing images or video to a computing system to generate 3D data from the vehicle positioned in the drive-in booth. A lighting system is positioned to illuminate an interior of the drive-in booth, and a tracking system is used to actuate the camera or the lighting system.

A process is provided for photographing a vehicle with the ovoid hemispherical dome that includes positioning the vehicle in the booth, selectively illuminating a first subset of lights arrayed in the booth, and collecting a first photograph of a plurality of photographs of the vehicle with illumination from the first subset of lights. Subsequently, the ovoid hemispherical dome or a circular stage is advanced to a second position, and a second subset of lights arrayed in the booth are selectively illuminated to collect a second photograph of a plurality of photographs of the vehicle while in motion and with illumination from the second subset of lights. The process continues by advancing the ovoid hemispherical dome or the circular stage to further positions until a predefined number of photos are obtained.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DESCRIPTION OF THE INVENTION

Figure 1A:
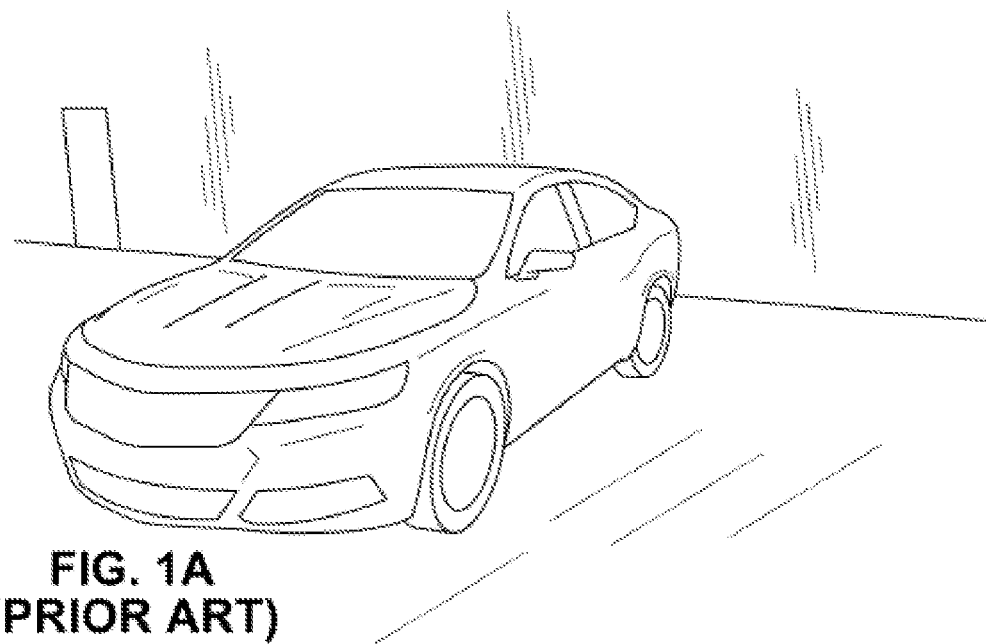
FIGS. 1A and 1B are typical non-studio quality vehicle photographs.
Figure 1B:
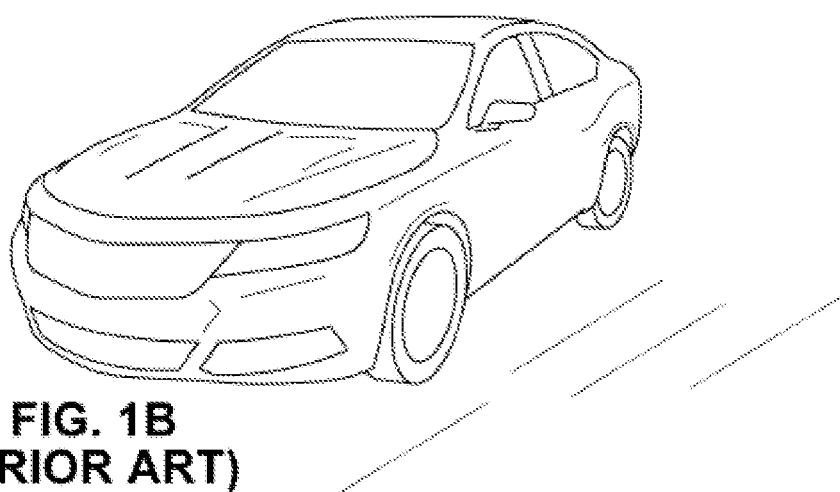
Figure 2A:
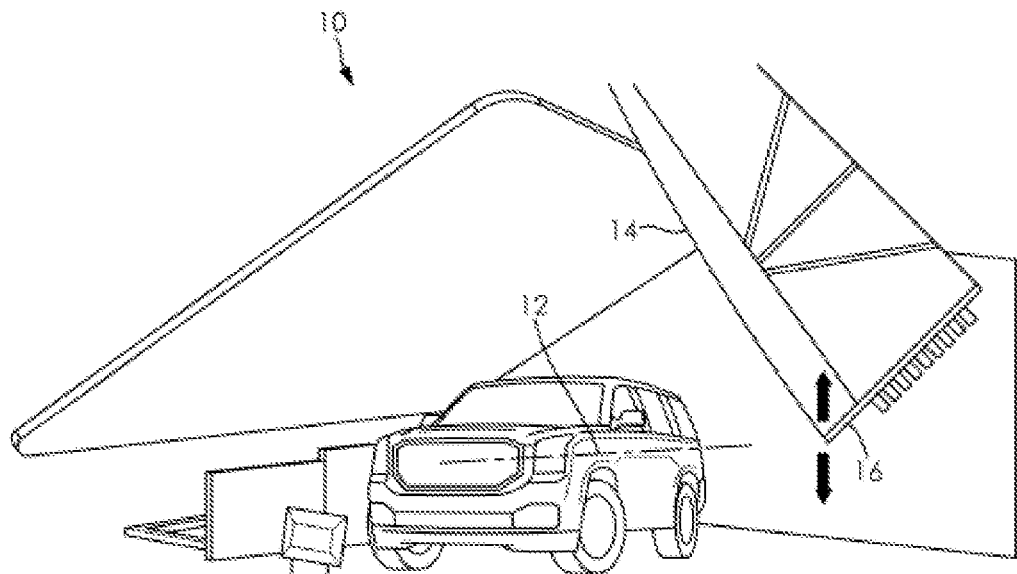
FIGS. 2A and 2B illustrate an existing studio configuration for generating a contrast break line on a vehicle with additive lighting.
Figure 2B:
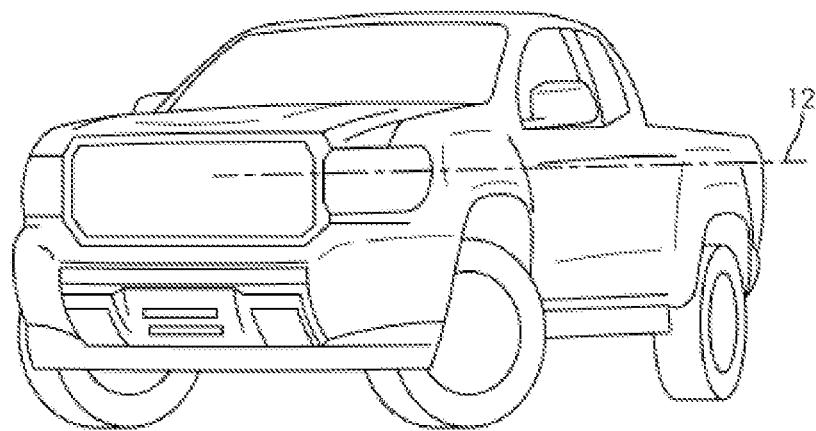

The present invention has utility as a vehicle photographic booth that accommodates cameras with lenses with focal lengths that avoid wide angle distortion that is common in low end car photography. Embodiments of the inventive photographic booth have an ovoid hemispherical dome shape with a camera mounted at the apex of the ovoid portion so as to accommodate longer focal length lenses. The overall dimension of the ovoid section of the dome for placement of a camera is determined by the available floor space of a user. In vehicle photography it has been determined that keeping a forty-foot distance from the vehicle is ideal, which equates to using a 105-135 mm lens on a standard 35 mm camera so as to avoid wide angle distortion in images of the vehicle. In a specific inventive embodiment, the camera lens has a focal length that is between 105-135 mm. The use of an enclosed ovoid hemispherical dome shape that rotates with respect to a stationary stage, or in the alternative a fixed enclosed ovoid hemispherical dome with a rotating stage allows for much less light to be needed as compared to a full open volume. Furthermore, an ovoid shape also provides a smaller fixed footprint than a full structure for an equal camera distance from a subject.

In specific inventive embodiments a series of photographs of a vehicle are captured in an automated process and the images are uploaded to a web template for display and recordation. The images captured in embodiments of the ovoid hemispherical photographic booths have controlled reflections from multiple angles and perspectives, and a viewer is able to discern whether there are surface imperfections, scratches, and dents on a vehicle surface. Reflections are controlled in the ovoid domed chamber with curved walls and a matching contoured door that are covered with a light scattering sheet material such as a white canvas or gray walls, as disclosed in U.S. Pat. No. 10,063,758 issued Aug. 28, 2018 and a circular dome photographic booth as disclosed in U.S. Patent Publication US2018/0160019A1, both of which are included herein in their entirety. It is further appreciated that the shell of the ovoid domed chamber may be made of light weight composite materials or plastics.

In specific embodiments of the inventive image capture system, the lighting style used to illuminate the vehicle within the enclosed ovoid chamber configuration is a sunset horizon style of lighting, where the lights are hidden below the curved wall that may be gray or white so as to use a sunset style reflection on the vehicle surface through subtractive lighting. A sunset style reflection refers to a hot horizon line on the vehicle with a rapid fall off (i.e., a sunset shot). In some inventive embodiments, light reflection from the sheet metal is hidden in the resulting images through lighting control. For example, in a specific embodiment, the lighting around the ovoid dome is controlled in such a way to maintain a consistent value of the vehicle's reflection. During the rotation, as the sheet metal becomes more efficient, relative to the camera position, the lighting is adjusted to compensate. It is appreciated that the light is much stronger at the profile view while it tapers off as it approaches a ¾ or ⅞ view. At these angles the rear lighting in the booth must be dimmer to appear consistent throughout.

It is to be understood that in instances where a range of values are provided herein, that the range is intended to encompass not only the end point values of the range, but also intermediate values of the range as explicitly being included within the range and varying by the last significant figure of the range. By way of example, a recited range of from 1 to 4 is intended to include 1-2, 1-3, 2-4, 3-4, and 1-4.

Embodiments of the inventive enclosable ovoid domed photographic booth provide a photography stage with horizontal lighting that may be configured as subtractive lighting that utilizes a single camera and associated lighting elements for multi-sequenced photographs of a vehicle from various angles when the vehicle is positioned on the stage. In a specific inventive embodiment, the vehicle is positioned on a stationary photographic stage, the camera is positioned at the apex of the ovoid portion of the hemispherical dome, and the ovoid hemispherical dome rotates or moves around the vehicle tracing a perimeter path formed as the apex mounted camera rotates with the ovoid hemispherical dome. The movement of the dome is readily performed by a motor or through manual manipulation. At least one handhold 41 is provided to facilitate manual rotation. Alternatively, in an inventive embodiment, the photographic stage in the enclosable ovoid domed booth may rotate the vehicle past a single camera mounted at the apex of the ovoid portion of the circular dome. The use of sequenced and automated image capture allows for the rapid image processing of vehicles for auction sales, dealer records, as well as car condition assessments for rental agencies, fleet management companies, public safety agencies, municipal and government agencies, etc. A complete set of vehicle images are collected in between 5 and 90 seconds allowing for high throughput imaging associated with an auto auction or manufacturer.

Embodiments of the inventive enclosable ovoid hemispherical domed photographic booth allow for a complete set of multi perspective high quality vehicle images to be obtained and recorded into a template or placed in a shared network folder in less than 90 seconds, and in some instances in approximately 5, 10, or 15 seconds. Thus, once a subject vehicle is photographed in the inventive enclosable ovoid hemispherical domed photographic booth, the vehicle is available and ready for sale online based on the uploaded images and VIN uploaded information. The rapid processing time of the inventive enclosable ovoid hemispherical domed photographic booth provides images that are equivalent to existing professional photographic staging methods that take several minutes to several hours to obtain a set of vehicle images. The rapid image processing and recordation of vehicle condition allows for new business models such as creating virtual or cyber dealerships where a wholesale customer never takes possession of a subject vehicle, and the vehicle is dropped shipped to the end retail customer. Photos obtained with the inventive system may be sold along with the subject vehicle for use by a purchasing used car retailer, and as it typically takes four days for the buyer to take delivery of the wholesale vehicle, with instant access to the vehicle photos the purchaser can start advertising the vehicle four days prior to physically taking possession of the vehicle.

Embodiments of the inventive enclosable ovoid or elongated circular domed photographic booth may utilize radio frequency identification (RFID) tags to identify and record vehicles as the vehicles are processed through the system. The RFID may be related to the vehicle identification number (VIN) of a vehicle to be processed. It is further appreciated that additional identifiers may be used illustratively including barcodes that relate to the VIN. Information related to the vehicle, such as vehicle make, model, body style, and color encoded in the VIN may be used to automatically adjust lighting, the height and/or angle of the gray wall to optimize photographic conditions, as well as camera height, zoom, and camera placement/position for a subject vehicle to be processed. Through control of lighting and camera firing sequence, the driver of a vehicle is virtually invisible as a result of being hidden by glass reflection. Further information that may be related to the RFID or barcode may include a dealership setting that may also indicate which dealer the vehicle is being shot for and incorporate that dealer's specific preferences such as lighting style, file size and format, number of photo shots and angles to be recorded. RFID or bar code information, read manually or automatically may also be used to project text onto the background of the shot or overlay text onto the file during processing, such as price, dealer name, vehicle specifications, mileage, etc.

Figure 4A:
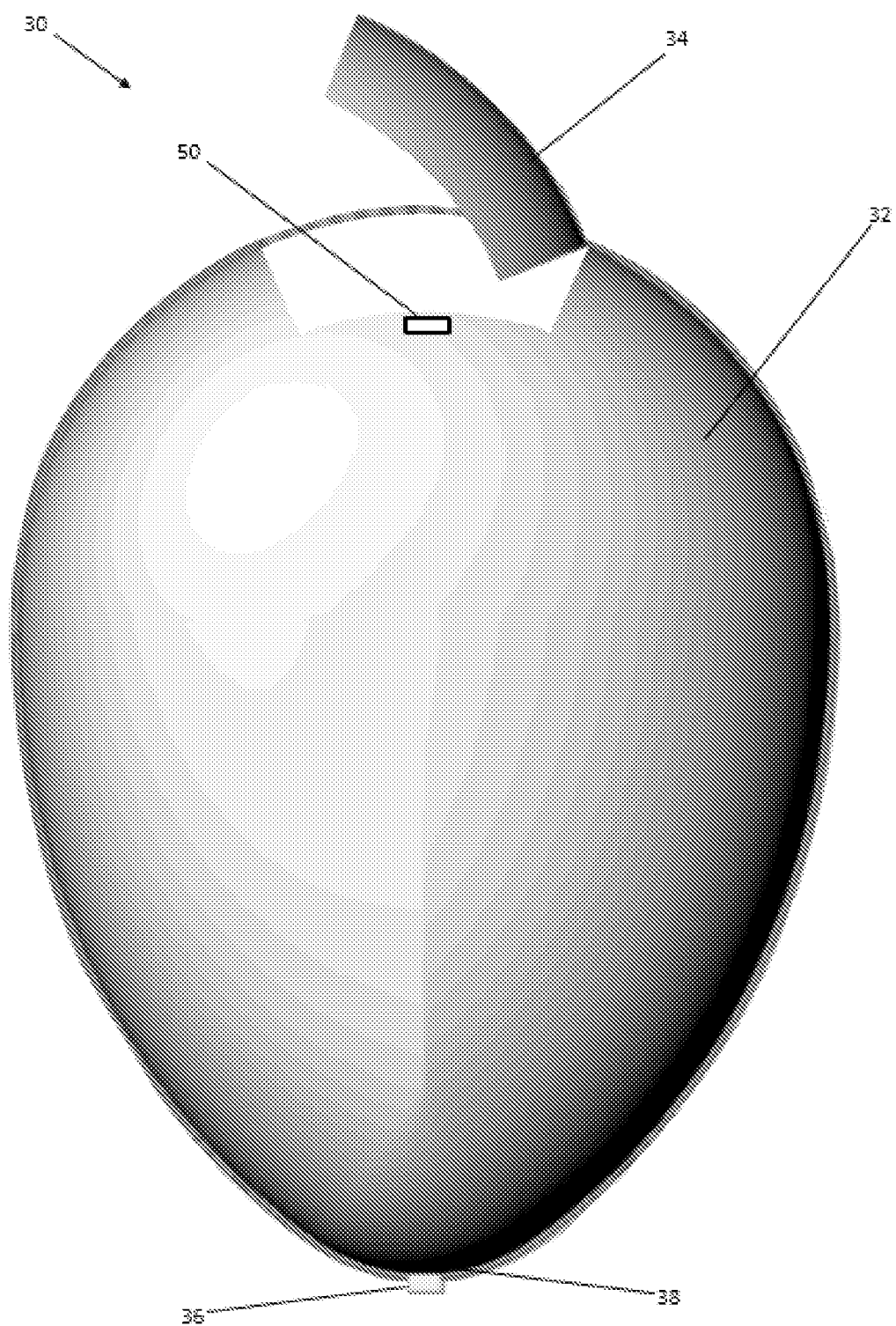
FIGS. 4A-4E illustrate a series of views of an ovoid hemispherical dome photographic booth in a partially open configuration with a camera mounted at the apex of the ovoid portion that provides controlled surface reflections on surfaces of the vehicles being photographed in accordance with embodiments of the invention: top view (FIG. 4A), left side view (FIG. 4B), first perspective view (FIG. 4C), wide end ¾ view with door closed (FIG. 4D), and a ¾ view of wide end portion with door in open position (FIG. 4E)
Figure 4B:
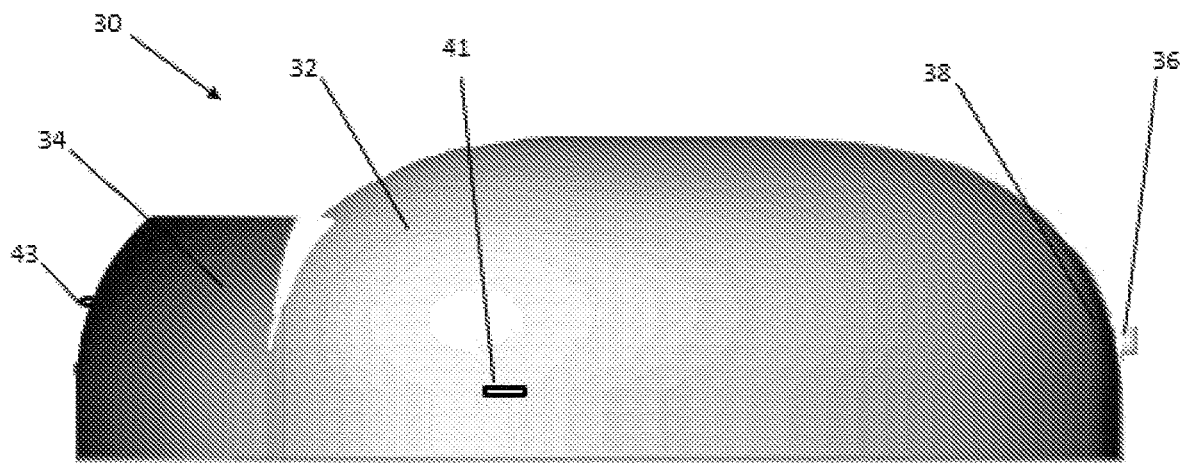
Figure 4C:
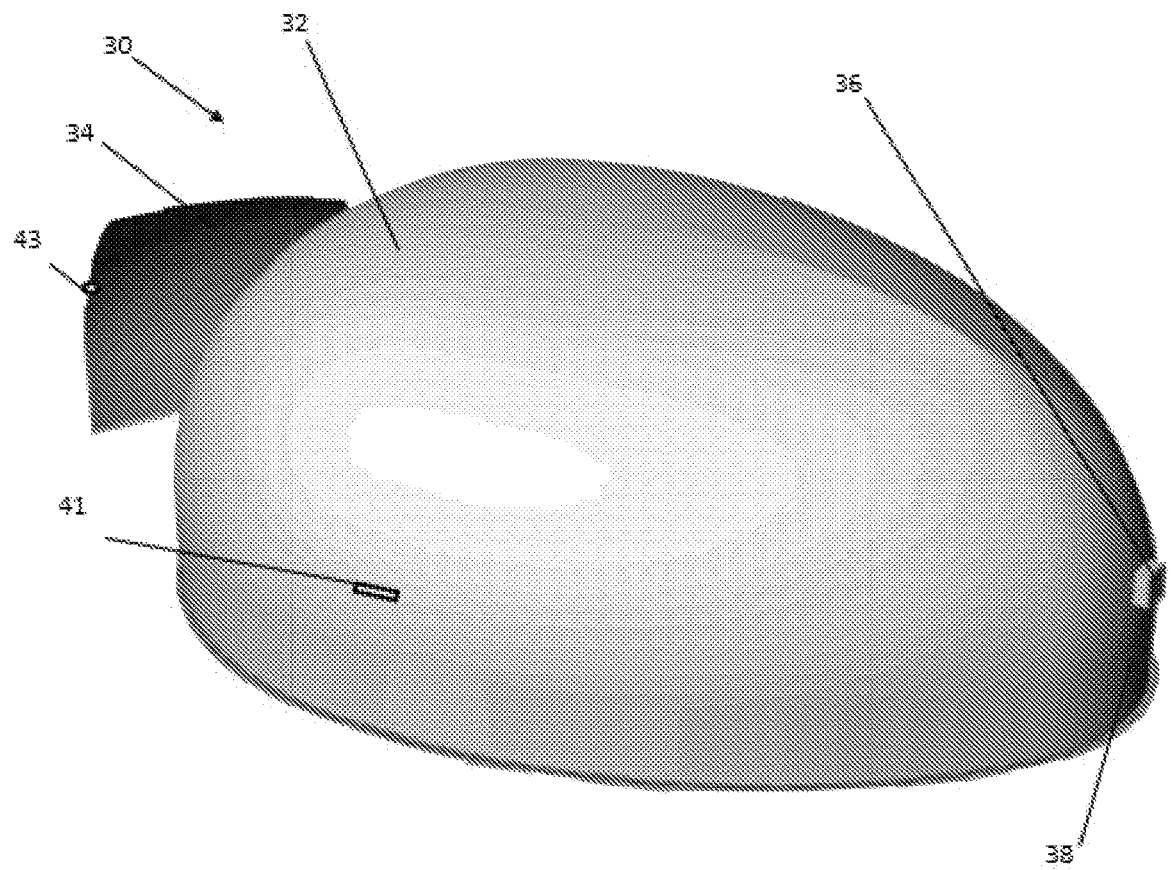
Figure 4D:
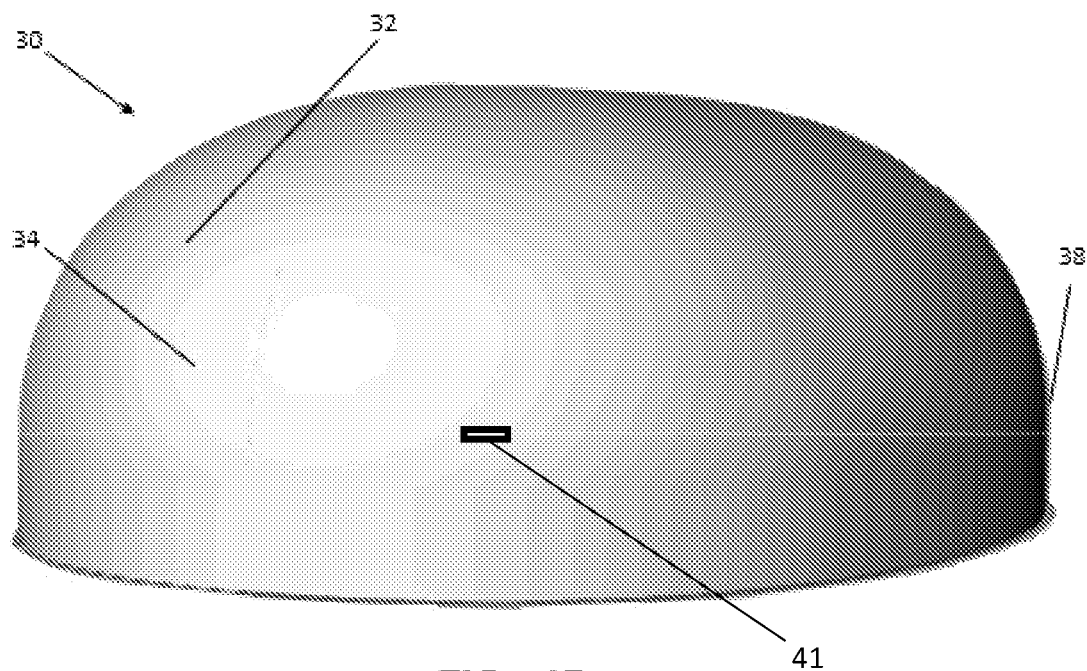
Figure 4E:
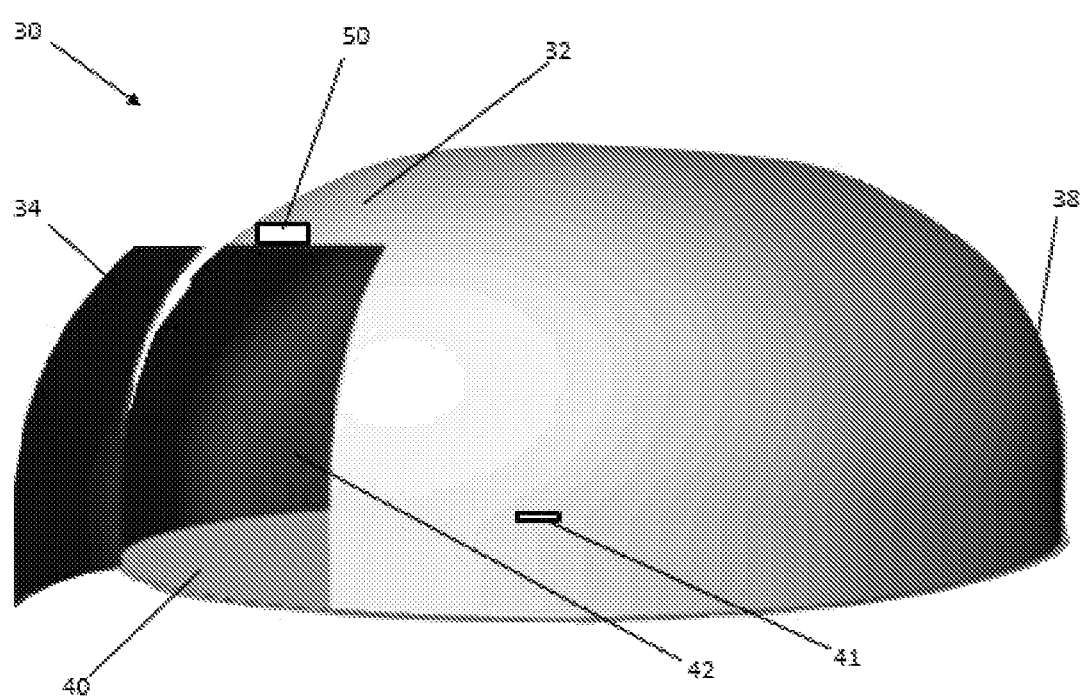

Referring now to the figures, FIGS. 4A-4E illustrate a series of views of an inventive ovoid hemispherical dome photographic booth 30 with semi-circular portion 32 and a camera 36 mounted at the apex of the ovoid portion 38 that provides controlled surface reflections on surfaces of the vehicles being photographed, as follows: top view (FIG. 4A), left side view (FIG. 4B), first perspective view (FIG. 4C), wide end ¾ view with door closed (FIG. 4D), and a ¾ view of wide end portion with door in open position (FIG. 4E). A hinged door 34 opens and closes to allow entry and exit of a vehicle to be photographed on a photographic stage 40 in an enclosed volume 42. The hinged door 34 in a specific embodiment, is positioned opposite the narrow apex of the ovoid portion 38. At least one handhold 41 is provided to facilitate manual rotation of the ovoid hemispherical dome photographic booth 30. An RFID reader, alphanumeric reader, or automatic bar code reader 50 may be mounted at or above the entrance to read the identification tag associated with a subject vehicle. The driver of the vehicle in some embodiments may have an RFID name tag to track who shot the images or to monitor productivity. In some inventive embodiments, an automatic door lock 43 is provided that automatically opens to allow the vehicle to back out following a complete set of preselected photographs being taken of the vehicle.

Figure 5:
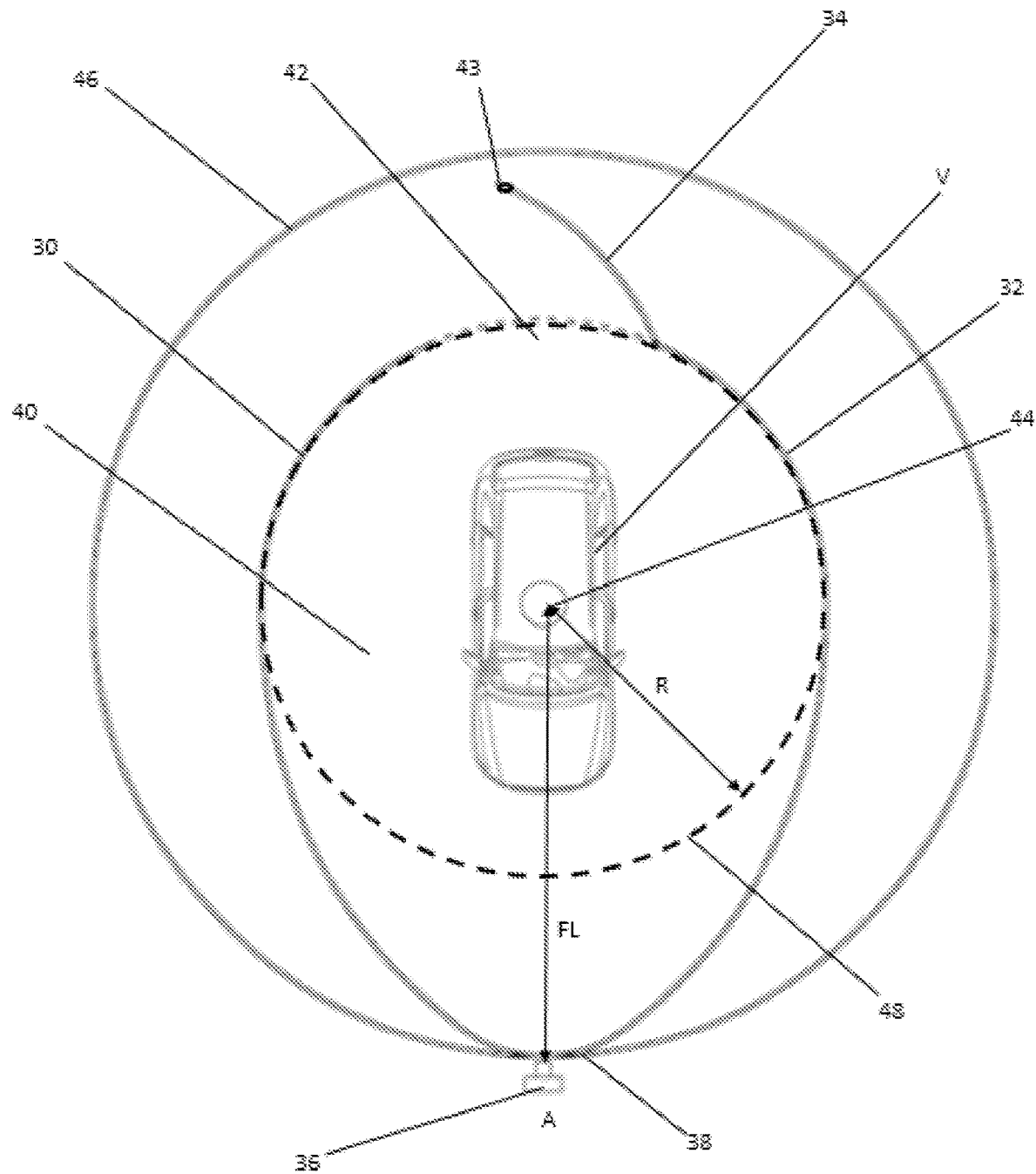
FIG. 5 illustrates a vehicle positioned in the center of a photographic stage, the vehicle being centered in the circular portion of the ovoid hemispherical dome photographic booth as shown in FIGS. 4A-4E.

FIG. 5 illustrates a top cutaway view showing a vehicle V positioned in the center 44 of a photographic stage 40, the vehicle generally centered close to the geometric focal point of the wider semi-circular portion 32 of the ovoid hemispherical dome photographic booth 30, as shown in FIG. 5. The ovoid hemispherical dome 30 or the platform of the photographic stage 40 rides on a track 48 to provide rotation of the camera 36 and vehicle V relative to each other. The focal length FL at the apex 38 is greater than the radius R of the circular platform of the photographic stage 40. In a specific inventive embodiment, the focal length is between 105-135 mm.

Figure 6:
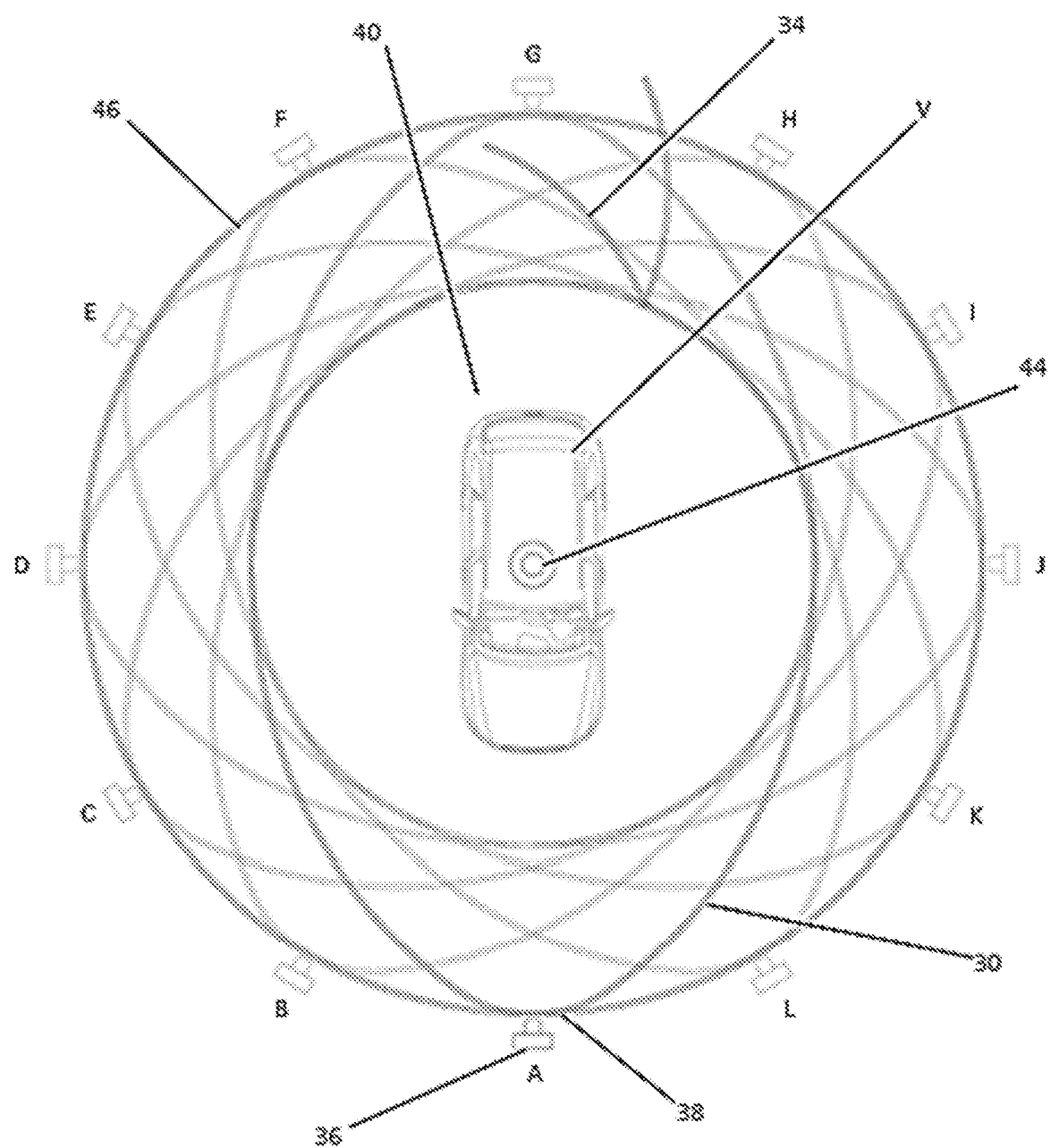
FIG. 6 illustrates the rotation of the ovoid hemispherical dome photographic booth of FIGS. 4A-4E about a vehicle on a stationary stage with twelve trigger points for the moving camera.

FIG. 6 illustrates the rotation of the ovoid hemispherical dome photographic booth 30 of FIGS. 4A-4E about a vehicle V on a stationary photographic stage 40. As shown letters A-L illustrate positions for twelve trigger points of the camera 36, along a circular arc 46 traced at the apex of the ovoid dome 30, where a set of images of the vehicle V are taken. It is appreciated that the number of trigger points for the camera may be higher or lower than twelve depending on the resolution of vehicle shots required. For a nearly seamless 3D rotatable image twenty-four or more trigger points may be required. In a specific inventive embodiment, the photographic system may be self-running with motorized wheels in the tracks or attached to the bottom of the walls of the ovoid dome 30 so that the ovoid dome 30 "drives" around the vehicle V automatically capturing images at intervals that are pre-determined by an end user. In still other inventive embodiments, the booth 30 is manually lifted and/or pushed a new photographic position around the vehicle V, regardless of whether a track is present on which the booth turns. The camera may be tripped through a series of pins set along the tracks 48 at defined intervals. In a specific inventive embodiment, the camera 36 is operated in a video mode, and a continuous video is obtained of the vehicle V as the camera 36 moves along the circular arc 46. In an inventive embodiment, following a complete 360-degree rotation of the ovoid hemispherical dome photographic booth 30, the door 34 of booth may open for backing out the vehicle V, or booth 30 may continue another 180 degrees so the vehicle V may pull forward and out.

Figure 3A:
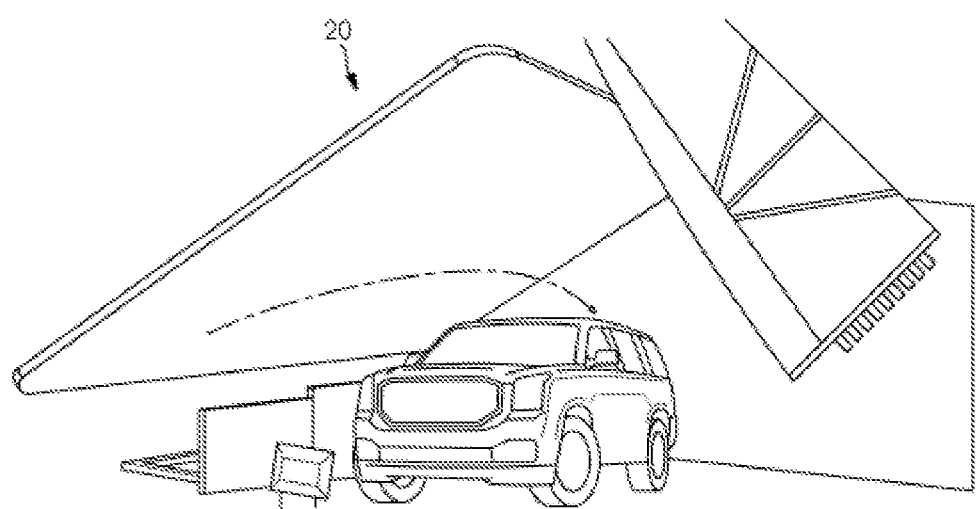
FIGS. 3A and 3B illustrate an existing studio configuration for generating a contrast break line on a vehicle with subtractive lighting.
Figure 3B:
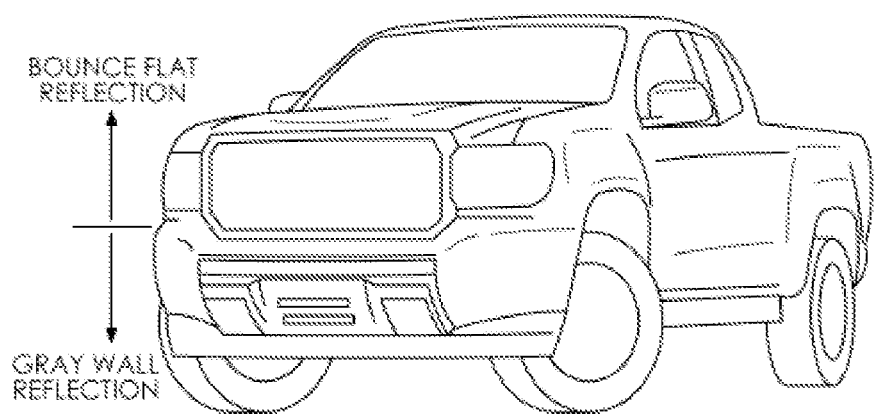

Embodiments of the inventive enclosable ovoid hemispherical dome photographic booth 30 employ hidden lighting elements behind a horizon wall or hip wall in the form of a gray wall to create a contrast break on the side of the vehicle with subtractive lighting. The subtractive lighting method produces a booth with all bounce lighting and 100% controlled reflections on the vehicle surfaces. No reflections of the light sources or of the lighting fixtures themselves show up in the vehicle surface paint. Embodiments of the structure booth form a large smooth white room, and then subtracting that white from the reflections using the gray wall for contrast break in reflection. A totally white room would make a subject vehicle look flat and dull with no contrast, and there would be no accent of the vehicles natural body lines. The inventive enclosable dome booth employs an innovative continuous 360 degree gray wall or partial 360, or straight sections creating the same contrast break or hiding direct reflections of the lighting as shown in FIG. 4D with the swing door 34 closed, to produce a clean horizon line in the vehicle's reflections at all angles about the perimeter of the vehicle. The shape of the ovoid hemispherical dome photographic booth 30 wraps light around the front and rear of the vehicle while also wrapping the horizon reflection around the vehicle, which allows the vehicle to be photographed from multiple angles and still have the same high end look without the need to adjust the lighting or gray wall for each shot for a given subject vehicle. A clean top edge of the horizon wall causes a crisp reflection in the vehicle and is the break point between highlight and shadow. The use of a 360 degree gray wall differs from a typical professional studio (see FIG. 3A) where the "gray wall" is usually a strip of cloth hung on a pole and positioned between the car and the light source, and is only used on one side of the car being shot at that time and would be positioned based on what works for a single camera angle. The gray wall used in embodiments of the invention is unique in the fact that the gray wall is a fixed hard structure that is optimized to give the desired reflection on a full range of vehicle shapes and sizes from multiple camera angles. Thus, while the viewing angle may change, the lighting style remains consistent across all viewpoints. The gray wall may be built from materials such as wood, composites, metals, etc., and may be in a fixed position or may be repositionable.

Embodiments of the inventive enclosable ovoid hemispherical dome photographic booth may use a curved horizon wall that both has a curved face surface and also curves around the front and back of the vehicle. The angle of the horizon wall provides bounce lighting that provides fill for the lower part of the vehicle. It is appreciated that a straight hip wall, a slant wall, or a radius wall are all operative herein. While it would be much easier to build the horizon wall as a simple vertical wall or as a slanted wall, the use of a curved face affords the lower part of the car some bounce fill light while not allowing the light to produce surface sheen on the wall and back to any of the cameras. If the wall were merely a slant board some camera angles would pick-up glare that would also show up as undesired reflections in some of the vehicle's surfaces. As light bounces off the curved gray wall surface the light is redirected at many angles and thus never builds up into a sheen, and still provides bounce light for the lower area of the vehicle. The radius of curvature of the gray wall panels may be adjusted depending on the desired lighting effect. In embodiments of the inventive drive-in booth, the wall is also painted so that the wall matches the floor color and tone as seen by the cameras. The blending of the wall with the floor is at the interface between the horizon walls and the floor of the dome booth. Because the horizon wall is on a different plane and has a curved surface, the wall actually needs to be painted one tone lighter than the floor to appear as the same tone to the cameras. The horizon wall structure is also used as a place to mount and conceal the lighting. From the lighting mounted position, the lights brighten the upper portion of the dome with soft light and brightly lights the portion of the wall right above its top edge of the gray wall creating the distinctive sunset like reflection in the vehicles paint. By creating an empty space or white bounce box between the back of the gray wall and the dome wall the strobe heads can be pointed downward so the light bounces off the floor and then up the wall, which significantly makes the beam of the light wider and gives a softer quality of light, while also dramatically cutting down on the amount of space needed between the gray wall and the structure wall. In a specific embodiment, the top of the gray wall is just 20" away from the structure wall. It is noted that the versatile 360-degree horizon wall concept will work equally well in still photography, video, or three-dimensional (3D) rendering.

It is appreciated that computer-generated imagery (CGI) vehicle rendering is also accomplished with lighting angles of the present invention. If all the measurements are the same and the lighting values are the same, then the virtual vehicle would look pretty much the same as a real vehicle in that environment. Even easier would be to shoot a high-dynamic-range imaging (HDRI) lighting map from the center of an inventive rotary stage. In simplest terms, a HDRI lighting dome is a sphere where the inside has a 360 panoramic image projected upon it and thought of as huge stained-glass dome where the glass looks exactly like the room as viewed from the center of the room and, has an infinite amount of light being projected through it. When a reflective 3D object like a car is placed in that virtual environment, then the reflective 3D object will reflect the lighting setup exactly as it would in real life. In this example a series of photographs simulate a virtual room space.

Figure 7:
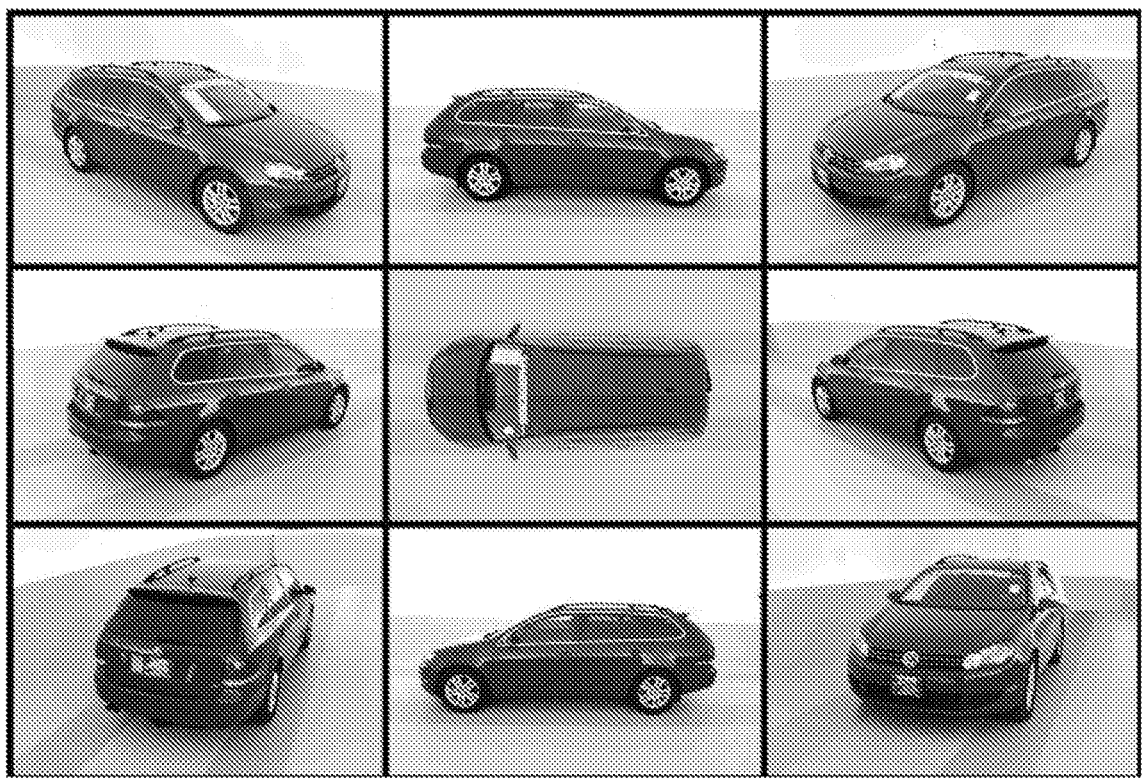
FIG. 7 is a series of high-quality photographs obtained within the system of the ovoid hemispherical dome photographic booth according to embodiments of the invention.

FIG. 7 is a series of high-quality photographs obtained within the system of the booth 30 according to embodiments of the invention. It is noted that to obtain this advertising quality look in a car photograph would normally take a professional photographer and two assistants the better part of a day to create these nine angles. The images as shown in FIG. 7 were captured and produced in 15 seconds with the horizon wall lighting technique that give the vehicle a sunset look that accents the body shape of the vehicle. It is also noted that although photographers may set up single angles in this style, embodiments of the inventive domed booth is the first to create the horizon look over 360 degrees of vehicle reflection.

Figure 8:
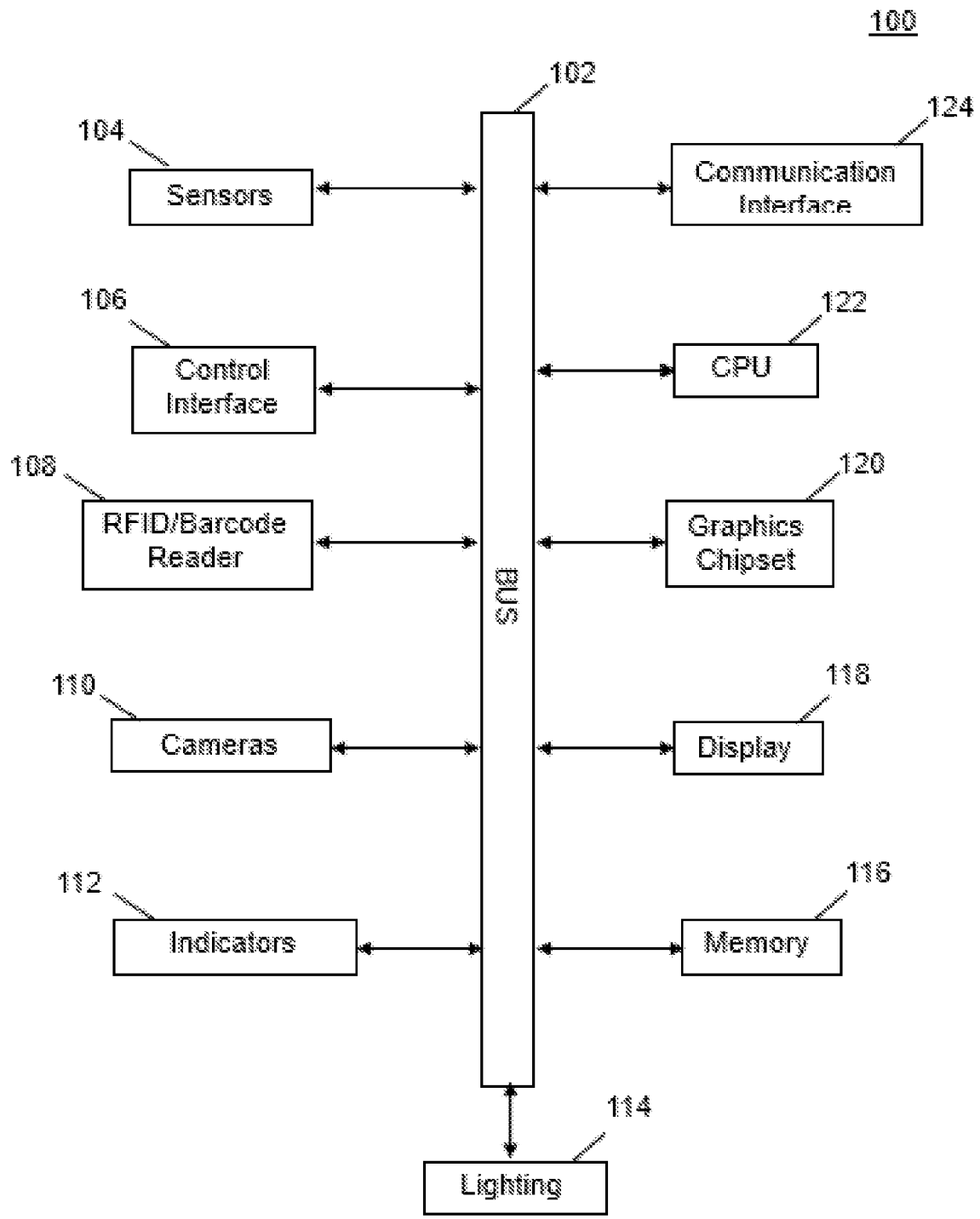
FIG. 8 is a system block diagram of the major components for photographing vehicles in accordance with embodiments of the invention.

FIG. 8 is a system block diagram 100 of the major components for photographing vehicles. A central process unit (CPU) 122 coordinates and controls the overall operation of the photographing system 100 that may be operated in the ovoid hemispherical domed booth 30. The communication interface 124 is representative of various links and input connections and devices illustratively including but not limited to wired and wireless links, optical drives, universal serial bus (USB), flash memory slot, and combinations thereof, for receiving and sending data that may or may not be in real time. The bus 102 links the various components in the system. Memory 116 serves as storage for operating programs and firmware for the photographic system 100. A database with vehicle and client information is stored in Memory 116. Memory 116 is made up of read-only memory ROM and random-access memory (RAM). Graphics chipset 120 drives a display 118. The display 118 may be liquid crystal display (LCD), light emitting diode (LED), or other known display technologies. Control interface 106 may include knobs, buttons, and other touch sensitive controls for selecting various menu items or for inputting alphanumeric information. Sensors 104 sense the presence of a vehicle and the vehicle position. RFID/barcode 108 is a reader that detects and interprets tags mounted to vehicles or driver identification (ID) cards. Cameras 110 and lighting 114 are controlled and sequenced by the CPU 122; the cameras and/or lights triggered in a preselected sequence or in synchronicity. Indicators 112 provide visual feedback to system users. In inventive embodiments, the central process unit (CPU) 122, or master and node computers, in the case of many cameras in use—these processing nodes speedup download and system throughput, and the CPU 122 coordinates and controls the plurality of cameras in the ovoid hemispherical domed booth 30. By way of example, the CPU 122 automatically adjusts lighting, the height and/or angle of a wall, camera triggering, camera f-stop, length of exposure, or combinations thereof. In specific inventive embodiments, a communication interface connects the plurality of cameras via one or more of wired and wireless links, optical drives, universal serial bus (USB), flash memory slot, and combinations thereof for receiving and sending data.

Figure 9:
FIG. 9 is a photograph showing a projection system in accordance with an embodiment of the invention.

FIG. 9 is a photograph showing a projection system display 150. In a specific inventive embodiment, the projection system display 150 is projected on to the wall of the photographic chamber and provides the view from a top down camera to aid a driver in centering a vehicle in the photographic chamber. The projection system may also be used in conjunction with the vehicle data base to show a photographer step by step which interior and details photos that are needed for that vehicle. For example, a sample graphic or photograph of the next shot needed is projected along with notes on which lighting preset to use. Furthermore, the projection may provide consistency reminders like "straighten the steering wheel". The projection system may also display a running clock or countdown clock to keep the photographer moving according to the facilities production schedule. If what is being projected is also being recorded, the operator's performance can be evaluated against the direction given by the automated system. It is noted that since the flash units for the image taking cameras are so much brighter than the projected image, the projection image is washed out and never shows up in the photographs.

As a person skilled in the art will recognize from the previous detailed description and from the figures and claims, modifications and changes can be made to the preferred embodiments of the invention without departing from the scope of this invention defined in the following claims.

The invention claimed is:

1. A system for photographing a vehicle, the system comprising:
    a drive-in booth shaped as an ovoid hemispherical dome having a wider semi-circular portion and a narrower ovoid portion;
    a camera mounted at an apex of said ovoid portion at a focal length from the vehicle, where the focal length is greater than a radius of the semi-circular portion, said camera providing images or video to a computing system to generate 3D data from the vehicle positioned in the drive-in booth;
    a lighting system positioned to illuminate an interior of said drive-in booth; and
    a tracking system to actuate said camera or said lighting system.

2. The system of claim 1 further comprising a database in communication with said camera and receiving images therefrom.

3. The system of claim 1 wherein said camera is positioned so that the vehicle is in focus when said camera is equipped with a lens with a focal length that is between 105-135 mm.

4. The system of claim 1 further comprising a hinged door adapted to receive the vehicle therethrough.

5. The system of claim 4 wherein said hinged door is positioned opposite an apex of said ovoid portion.

6. The system of claim 1 wherein an enclosed volume of said drive-in booth defines a circular stage for holding the vehicle, the circular stage having a second radius that is equivalent to the radius of the semi-circular portion of the ovoid hemispherical dome.

7. The system of claim 6 further comprising a track, wherein said ovoid hemispherical dome or said circular stage rides on said track to provide rotation of said camera and vehicle relative to each other.

8. The system of claim 7 further comprising a series of pins set along the track at defined intervals or a motorized wheel mechanically coupled to said track.

9. The system of claim 1 further comprising a plurality of lights aimed into said drive-in booth that trigger in a predetermined sequence or in synchronicity based on a position of the vehicle within said drive-in booth.

10. The system of claim 1 further comprising a central process unit (CPU) in operational control of at least one of said camera, said lighting system, and movement of one or more of said ovoid hemispherical dome, a circular stage, or a wall.

11. The system of claim 1 further comprising a wall that implements subtractive lighting on the surface of the vehicle.

12. The system of claim 1 further comprising a radio frequency identification (RFID) reader or alphanumeric reader for identifying vehicle and client parameters upon entry of the vehicle into said booth.

13. The system of claim 12 wherein said RFID reader or said alphanumeric reader obtains a vehicle identification number (VIN) of the vehicle to be processed or information about the vehicle, the information being one or more of vehicle make, model, body style, and vehicle color.

14. The system of claim 13 wherein said VIN or the information is input to a central process unit (CPU), said CPU in operational control of at least one of said camera, said lighting system, and movement of one or more of said ovoid hemispherical dome, a circular stage, or a wall.

15. A process for photographing a vehicle with the system of claim 1 comprising:
    positioning the vehicle in said booth;
    selectively illuminating a first subset of lights arrayed in said booth;
    collecting a first photograph of a plurality of photographs of the vehicle with illumination from said first subset of lights;
    advancing said ovoid hemispherical dome or a circular stage to a second position;
    selectively illuminating a second subset of lights arrayed in said booth;
    collecting a second photograph of the plurality of photographs of the vehicle while in motion and with illumination from said second subset of lights; and
    advancing said ovoid hemispherical dome or said circular stage to further positions until a predefined number of photos are obtained.

16. The process of claim 15 further comprising reading a radio frequency identification (RFID) or alphanumerical code associated with the vehicle with an RFID reader or an alphanumeric reader.

17. The process of claim 15 further comprising automatic adjustment of lighting, a height of a wall within said booth, an angle of said wall within said booth, camera operation, or a combination thereof.

18. The process of claim 15 further comprising uploading the collection of photographs of the plurality of photographs to a web template for display and recordation.

19. The process of claim 15 wherein the selectively illuminating is a sunset horizon style of lighting.

20. The process of claim 15 further comprising applying subtractive lighting in the selectively illuminating.

* * * * *